United States Patent [19]

Bayer

[11] Patent Number: 4,835,035

[45] Date of Patent: May 30, 1989

[54] THERMOSET POLYMER COATING WITH ORGANOPOLYSILOXANE FOR CLOSURE ASSEMBLY

[75] Inventor: John W. Bayer, Toledo, Ohio

[73] Assignee: Anchor Hocking Corporation, Lancaster, Ohio

[21] Appl. No.: 5,042

[22] Filed: Jan. 12, 1987

[51] Int. Cl.$^4$ ........................ B32B 3/00; B65D 53/00; G09F 3/00; B05D 3/02

[52] U.S. Cl. .................................... 428/187; 428/202; 428/204; 428/209; 428/447; 428/445; 428/450; 428/451; 428/515; 428/914; 427/147; 427/387; 427/388.1; 427/409; 215/230; 215/347; 215/DIG. 2; 40/311

[58] Field of Search ............... 428/447, 448, 450, 451, 428/914, 187, 202, 204, 209, 515; 215/230, 341, 347, DIG. 2, DIG. 4; 40/311; 427/147, 387, 388.1, 409

[56] References Cited

U.S. PATENT DOCUMENTS

| | | | |
|---|---|---|---|
| 3,633,781 | 1/1972 | Zapato | 215/347 X |
| 4,151,924 | 5/1979 | Jameson | 215/DIG. 2 |
| 4,253,580 | 3/1981 | Doi et al. | 215/230 X |

OTHER PUBLICATIONS

"Silicone Alkyols", Bernard H. Kress and Harold A. Hoppens, Official Digest, Oct. 1952, pp. 689-699.

*Primary Examiner*—Ellis P. Robinson
*Assistant Examiner*—Susan S. Rucker

[57] ABSTRACT

A thermoset polymer coating with an effective ink-releasing amount of a liquid, organic soluble dimethyl- or methyl/alkyl organopolysiloxane for use in a closure assembly, the assembly including a metal closure with a top and depending skirt, the thermoset polymer coating being applied to the inside closure top and printed with ink indicia, a polyvinyl acetate coating applied over the ink, and the ink indicia being removed on the polyvinyl acetate-coated liner by the customer for promotional purposes such as for prizes, etc.

14 Claims, 1 Drawing Sheet

THERMOSET POLYMER COATING WITH ORGANOPOLYSILOXANE FOR CLOSURE ASSEMBLY

BACKGROUND OF THE INVENTION

The present invention relates to a thermoset polymer coating with an effective ink-releasing amount of a liquid, organic solvent soluble dimethyl- or methyl/alkyl organopolysiloxane for use in a closure assembly, the assembly including a metal closure with a top and depending skirt, the thermoset polymer coating being applied to the inside closure top and printed with ink indicia, the ink indicia being removed on a coated liner by the customer for promotional purposes such as for prizes, etc.

It is desirable to provide a coating for the inside closure top of a closure assembly, whereby the coating can be printed upon by ink indicia for later removal on a removable liner.

OBJECTS OF THE INVENTION

It is an object of the present invention to provide a thermoset coating for a closure assembly as well as to provide a novel closure assembly, the thermoset coating being adapted for printing thereon with ink indicia, that is subsequently easily removed on an adjacent liner by pulling the liner away for promotional purposes.

It is an object of the present invention to provide a method of making a closure assembly comprising a closure with a top and depending skirt and a thermoset polymer coating on the inside top of the closure, ink indicia printed on the thermoset polymer coating, a polyvinyl acetate coating next to the ink indicia and adhered to a polyolefin liner adapted for removal from the closure assembly, the method comprising the steps of: (A) mixing (1) a water-insoluble, organic solvent soluble, low molecular weight, liquid organopolysiloxane partial condensation hydrolysis product of

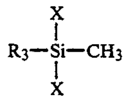

where $R_3$ is an alkyl group of 1 to 4 carbon atoms and X is chlorine or an alkoxy group of 1 to 3 carbon atoms with (2) the thermoset polymer to form the thermoset polymer coating on the inside of the closure top, (B) printing on the thermoset polymer coating with ink to form ink indicia on the surface of the thermoset polymer coating opposite the closure top, (C) coating with a polyvinyl acetate coating, adjacent the thermosetting coating with ink indicia, (D) providing a circular polyolefin liner, (E) removing the liner with the ink indicia that is released with the polyvinyl acetate coated liner from the surface of the thermoset polymer coating.

BRIEF DESCRIPTION OF DRAWING

These and other objects will be apparent from the specification that follows, the appended claims, and the drawings, in which:

SUMMARY OF THE INVENTION

Figure 1:
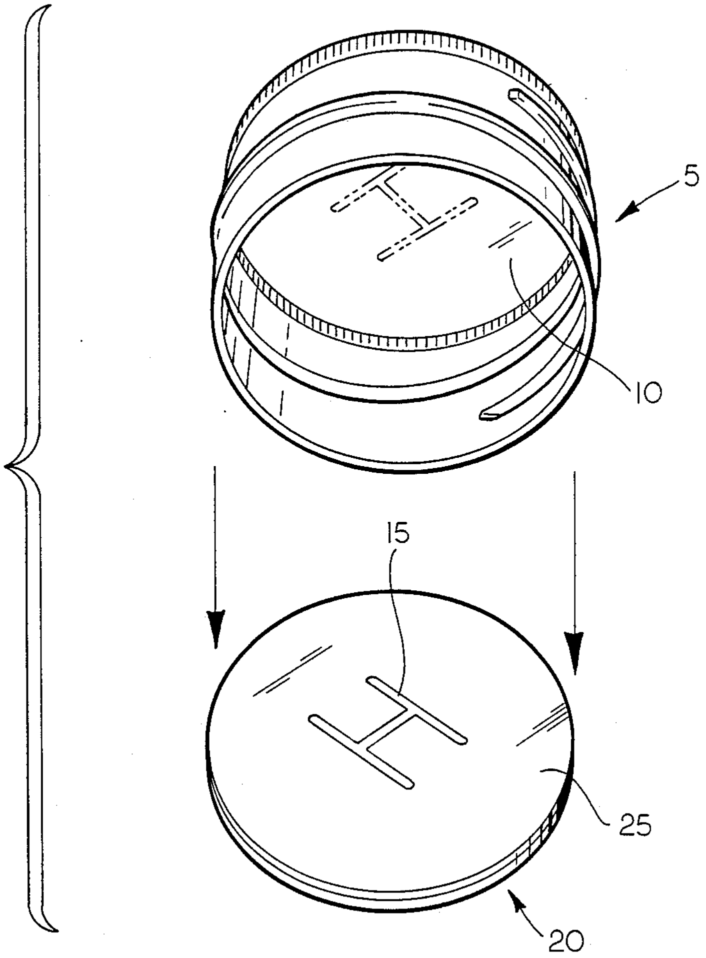
FIG. 1 is a perspective view of a closure assembly of the present invention showing were ink indicia had been printed on a thermoset polymer coating on the inside of the closure top and showing the ink indicia removed with the coated liner.

The present invention provides a thermoset polymer coating for use in a closure assembly comprising a plastic closure with a top and a depending skirt for engagement with a container finish, the thermoset polymer coating being on the inside top surface of the closure top, the thermoset polymer coating comprising a thermoset polymer and an effective ink-releasing amount of an organic solvent soluble, water-insoluble, liquid low molecular weight organopolysiloxane hydrolysis product of:

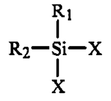

where X is a halogen or an alkoxy group of 1 to 6 carbon atoms, $R_1$ and $R_2$ being alkyl group, at least one of $R_1$ and $R_2$ being a methyl group, the organopolysiloxane having the following recurring unit:

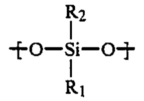

there being ink indicia on the surface of the thermoset coating, the thermoset polymer coating having limited adhesion with the ink, there being a polyvinyl acetate coating over the ink and adhered to a polyolefin liner, the ink adhering to the polyvinyl acetate coating on the liner and releasing from the thermoset polymer coating when the liner is removed from the surface of the thermoset polymer. The low molecular weight organopolysiloxane has a number average molecular weight of about 250 to 4000.

The present invention also provides a closure assembly comprising a top and a depending skirt for a closure finish, a thermoset polymer coating for the inner surface of the closure top, the coating comprising a thermoset polymer and an effective ink-releasing amount of a water-insoluble, organic solvent soluble, low molecular weight dialkyl organopolysiloxane that is a hydrolysis reaction product of a difunctional organo-silane, the thermoset polymer coating having a limited adhesion with the ink.

The present invention provides a method of making a closure assembly for promotional purposes such as prizes for customers, the novel method being a method of making a closure assembly comprising a closure with a top and depending skirt and a thermoset polymer coating on the inside top of the closure, ink indicia printed on the thermoset polymer coating a polyvinyl acetate coating next to the ink indicia and adhered to a polyolefin liner adapted for removal from the closure assembly, the method comprising the steps of: (A) mixing (1) a water-insoluble, organic solvent soluble, low molecular weight, liquid organopolysiloxane partial condensation hydrolysis product of

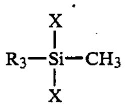

where $R_3$ is an alkyl group of 1 to 4 carbon atoms and X is chlorine or an alkoxy group of 1 to 3 carbon atoms with (2) the thermoset polymer to form the thermoset polymer coating on the inside of the closure top, (B) printing on the thermoset polymer coating with ink to form ink indicia on the surface of the thermoset polymer coating opposite the closure top, (C) coating a polyvinyl acetate coating adjacent to the thermoset polymer coating with the ink indicia, (D) providing a circular olefin copolymer liner, (E) removing the liner with the ink indicia that is released with the polyvinyl acetate coated liner from the surface of the thermoset polymer coating.

DETAILED DESCRIPTION OF THE INVENTION

In the above thermoset coating, the closure assembly and the novel method, it is preferred that the organic solvent soluble liquid organopolysiloxane be a partial condensation hydrolysis product of

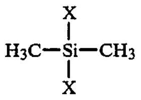

2

The number average molecular weight of the condensation product is generally about 500 to 4000, preferably about 750 to 2000 and optimally, about 800 to 1500.

The hydrolyzable group of the starting silane is preferably chlorine, although good results are obtained with alkoxy groups, preferably ethoxy, such as methoxy, propoxyl and butoxy. Other halogens can be used such as bromine as the hydrolyzable group.

Excellent results have been obtained by using Dow Corning silicone fluids—preferably the liquid dimethyl polysiloxanes. Outstanding results are obtained with Masil 265HV-liquid alkyl methyl siloxane fluid.

EXAMPLE

A test was designed to evaluate Mazer Chemical Company's printable lubricants, commonly utilized in metal litho printing inks, as additives to the alkyd size coat used in transfer print coating system. Watson-Standard furnished a non-lubricated version of 22-492A coating for the test. The W-S non-lubricated coating is numbered 29-020.

The Mazer lubricants tested in this study were:

Masil 1066C-Organo Silicone Surfactant
Masil 265HV-Alkyl Methyl Fluid
Masil 266-50% Alkyl Methyl Emulsion
Masil 260A-Leveling Aid The metal coating sequence used was as follows:

2. Simulated outside bake-390° F., 10 min.
2. 29-020+lubricant-325° F., 10 min.
3. Acme M-99524 transfer ink.
4. Mobil 9806 EVA adhesive (wet inked)-325° F., 10 min.
5. Simulated outside bake-325° F., 10 min.

Coatings were applied with an 18# Meyer Bar. After the coating sequence, EVA III blue liner (polyethylene vinyl acetate copolymer) was adhered by bonding for 1½ seconds at 350° F.

The lubricants were tested at concentrations of 5% and 10% dry film concentrations (3 oz. and 6 oz./gallon, respectively).

Considering lubricant miscibility, surface uniformity, wetting, and ink transfer, the Masil 265HV lubricant was outstanding as an additive to the size coat to improve ink transfer.

Masil 265HV fluid is a proprietary silicon fluid that is a clear, inert, non-toxic, and odorless product. The liquid product demonstrates excellent thermal resistance even when subjected to 400° F. (200° C.) for over eight hours with no detrimental effects. Surfaces of the metal article, if desired, can be finished with little or no need of cleaning. The product also provides increased organo-compatibility and lubricity as shown in the following Table of Physical Properties.

| TYPICAL PROPERTIES OF MASIL 265 HV FLUID | |
|---|---|
| APPEARANCE | CLEAR YELLOW LIQUID |
| ODOR | NIL TO TRACE |
| SPECIFIC GRAVITY AT 25° C. | 1.015 |
| VISCOSITY AT 25° C. | 1650 CPS. |
| REFRACTIVE INDEX AT 25° C. | 1.4725 |
| POUR POINT, °C. | BELOW −20 |
| FLASH POINT (PMCC), °F. | GREATER THAN 350 |
| FALEX | |
| LUBRICITY, TORQUE POUND INCHES AT 1000 PSI LOAD | 18 TYPICAL |
| THERMAL STABILITY, 8 HRS. AT 200° C. | PASS |
| COMPATIBILITY | MOST ORGANIC SOLVENTS |

Generally the liquid polyorganosiloxane is used in amounts of about 1 to 20 wt.%, and preferably about 5 to 10 wt.% of the thermoset coating.

As to the thermosetting polymer for the thermoset polymer coating, suitable polymers are alkyds or other polyesters that are crosslinked, for instance, with a compatible monomer such as styrene; polyurethanes; phenol-formaldehyde polymers; and crosslinkable vinyl polymers and acrylic polymers.

The liner, that is removable, is preferably polyethylene or polypropylene copolymer. Generally the liner is about 20 to 40 mils thick, the polyvinyl acetate coating on the liner (that is a copolymer of an olefin such as ethylene or propylene or butylene and a copolymerizible monomer such as vinyl acetate, ethylene acrylate) is about ½ to 3 mils thick, and the thermoset coating is about ½ to 3 mils in thickness.

In the drawings, a metal closure 5 is shown. A thermoset coating 10 is provided on the inside of the closure top. Ink indicia 15, in FIG. 1, is shown printed on the thermoset polymer surface. In FIG. 1 a polypropylene liner 20 is shown before assembly of the closure structure.

Figure 2:
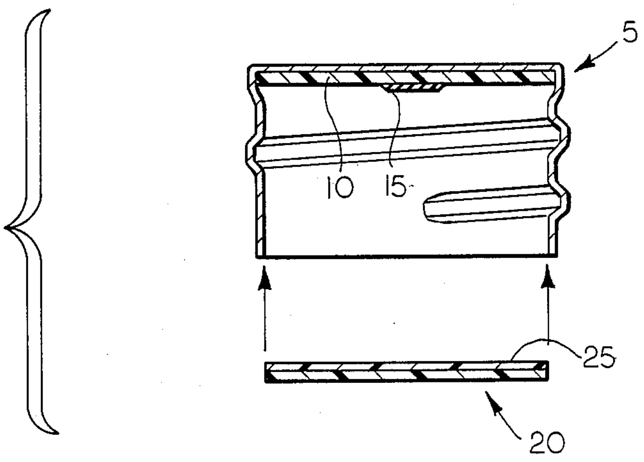
FIG. 2 is a cross-sectional view of the closure assembly before the liner is inserted.

The closure asssembly is shown in FIG. 2, a polyvinyl acetate coating 25 being provided on one side of the liner adjacent the ink indicia.

FIG. 1 shows the closure after removal of the liner 20, the ink indicia 15 being removed from the thermoset polymer coating 10 and the ink being adhered to the polyvinyl acetate coating 25 of the liner 20.

What is claimed is:

1. A thermoset polymer coating for use in a closure assembly comprising a metal closure with a top and a depending skirt for engagement with a container finish, the thermoset polymer coating being on the inside top surface of the closure top, the thermoset polymer coating comprising a thermoset polymer and an effective ink-releasing amount of an organic solvent soluble, water-insoluble, liquid low molecular weight organopolysiloxane hydrolysis product of:

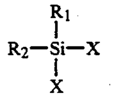

where X is a halogen or an alkyl group of 1 to 6 carbon atoms, $R_1$ and $R_2$ being alkyl groups of 1 to 4 carbon atoms, at least one of $R_1$ and $R_2$ being a methyl group, the number average molecular weight of the organopolysiloxane hydrolysis product being about 250 to 4000, the organopolysiloxane having the following recurring unit:

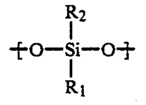

there being ink indicia on the surface of the thermoset coating, the thermoset polymer coating having limited adhesion with the ink, there being a polyvinyl acetate coating over the ink and adhered to an olefin copolymer liner, the ink adhering to the polyvinyl acetate coating on the liner and releasing from the thermoset polymer coating when the liner is removed from the surface of the thermoset polymer.

2. A coating as defined in claim 1 in which the $R_1$ and $R_2$ groups are methyl and the organosiloxane has two methyl groups in the recurring unit, the methyl groups dangling from the main molecular polymer chain, the number average molecular weight of the hydrolysis product being about 800 to 1500.

3. A coating as defined in claim 1 in which the organopolysiloxane has a number average molecular weight of about 500 to 4000.

4. A coating as defined in claim 1 in which the organopolysiloxane is the hydrolysis product of a silane having the formula

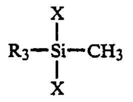

where $R_3$ is an alkyl group of 1 to 4 carbon atoms and X is chlorine or an alkoxy group of 1 to 2 carbon atoms.

5. A coating as defined in claim 1 in which the organopolysiloxane has a molecular weight of about 750 to 1500.

6. A method of making a closure assembly comprising a closure with a top and depending skirt and a thermoset polymer coating on the inside top of the closure, ink indicia printed on the thermoset polymer coating, a polyvinyl acetate coating next to the ink indicia and adhered to a polyolefin liner adapted for removal from the closure assembly, the method comprising the steps of:

(A) mixing (1) a water-insoluble, organic solvent soluble, low molecular weight, liquid organopolysiloxane partial condensation hydrolysis product of

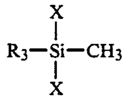

where $R_3$ is an alkyl group of 1 to 4 carbon atoms and X is chlorine or an alkoxy group of 1 to 3 carbon atoms, the number average molecular weight of the hydrolysis product being about 250 to 4000, with (2) the thermoset polymer to form the thermoset polymer coating on the inside of the closure top, (B) printing on the thermoset polymer coating with ink to form ink indicia on the surface of the thermoset polymer coating opposite the closure top, (C) coating with a polyvinyl acetate coating adjacent to the thermoset polymer coating with the ink indicia, (D) providing a circular polyolefin liner adjacent to the polyvinyl acetate coating, (E) removing the liner with the ink indicia that is released with the polyvinyl acetate coated liner from the surface of the thermoset polymer coating.

7. A method as defined in claim 6 in which the organopolysiloxane is the condensation product of:

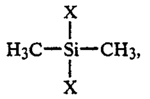

where X is chlorine and the average number molecular weight of the product is about 800 to 2000.

8. A method as defined in claim 6 in which the organopolysiloxane has a molecular weight of about 500 to 4000.

9. A closure assembly comprising a metal closure with a top and a depending skirt for engagement with a container finish, a thermoset polymer coating being on the inside top surface of the closure top, the thermoset polymer coating comprising a thermoset polymer and an effective ink-releasing amount of an organic solvent soluble, water-insoluble, liquid low molecular weight organopolysiloxane hydrolysis product of:

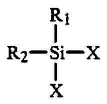

wherein X is a halogen or an alkoxy group of 1 to 6 carbon atoms, $R_1$ and $R_2$ being alkyl groups of 1 to 4 carbon atoms, at least one of $R_1$ and $R_2$ being a methyl group, the number average molecular weight of the hydrolysis product being about 250 to 4000, the organopolysiloxane having the following recurring unit:

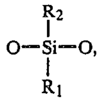

there being ink indicia on the suface of the thermoset coating, the thermoset polymer coating having limited adhesion with the ink, there being a polyvinyl acetate coating over the ink and adhered to an olefin copolymer liner, the ink adhering to the polyvinyl acetate coating on the liner and releasing from the thermoset polymer coating when the liner is removed from the surface of the thermoset polymer.

10. An assembly as defined in claim 9 in which the organopolysiloxane has two methyl groups in the recurring unit, the methyl groups dangling from the main polymer chain.

11. A closure assembly comprising a top and a depending skirt for a closure finish, a thermoset polymer coating for the inner surface of the closure top, the coating comprising a thermoset polymer and an effective ink-releasing amount of a water-insoluble, organic solvent soluble, low molecular weight dialkyl organopolysiloxane that is a hydrolysis reaction product of a difunctional organo-silane, the alkyl groups having 1 to 4 carbon atoms, at least one of which is methyl, the number average molecular weight of the reaction product being about 250 to 4000, there being ink indicia printed on the thermoset polymer coating, there being a polyvinyl acetate coating next to the ink indicia and adhered to a polyolefin liner adapted for removal from the closure assembly, the thermoset polymer coating having a limited adhesion with the ink.

12. A closure assembly as defined in claim 9 in which the organo-silane comprises methyl groups attached to Si and alkoxy groups of 1 to 4 carbon atoms attached to Si, the molecular weight being about 800 to 1500.

13. An assembly as defined in claim 9 in which the organopolysiloxane has a molecular weight of about 750 to 2000.

14. A closure assembly as defined in claim 11 in which the number average molecular weight is about 800 to 1500.

* * * * *